(12) United States Patent
Halling

(10) Patent No.: US 6,227,546 B1
(45) Date of Patent: May 8, 2001

(54) RESILIENT SEAL AND METHOD OF USING A RESILIENT SEAL

(75) Inventor: Horace P. Halling, Durham, CT (US)

(73) Assignee: Jetseal, Inc., Spokane, WA (US)

( * ) Notice: Subject to any disclaimer, the term of this patent is extended or adjusted under 35 U.S.C. 154(b) by 0 days.

(21) Appl. No.: 09/277,709

(22) Filed: Mar. 26, 1999

(51) Int. Cl.[7] .................................................. F16T 15/02
(52) U.S. Cl. ...................... 277/312; 277/630; 277/644; 277/647; 277/654
(58) Field of Search .................................. 277/312, 630, 277/637, 644, 654, 647, 636

(56) References Cited

U.S. PATENT DOCUMENTS

| | | |
|---|---|---|
| 836,950 | 11/1906 | Wilcox . |
| 1,891,424 | 12/1932 | Kirkpatrick . |
| 1,985,475 | 12/1934 | Victor . |
| 2,459,720 | 1/1949 | Poltorak . |
| 3,012,802 | 12/1961 | Waite . |
| 3,192,690 | 7/1965 | Taylor . |
| 3,797,836 | 3/1974 | Halling . |
| 3,820,799 | 6/1974 | Abbes et al. . |
| 3,869,132 | 3/1975 | Taylor et al. . |
| 3,940,152 | 2/1976 | Fournier . |
| 4,121,843 | 10/1978 | Halling . |
| 4,173,252 * | 11/1979 | Sakai et al. ............................... 165/9 |
| 4,218,067 | 8/1980 | Halling . |
| 4,261,584 | 4/1981 | Browne et al. . |
| 4,378,119 * | 3/1983 | Luxford et al. . |
| 4,441,726 | 4/1984 | Uhl . |
| 4,589,666 | 5/1986 | Halling . |
| 4,602,888 | 7/1986 | Court et al. . |
| 4,756,332 | 7/1988 | Grasseschi . |
| 4,759,555 | 7/1988 | Halling . |
| 4,798,392 | 1/1989 | Tozer . |
| 4,813,692 | 3/1989 | Halling et al. . |
| 4,832,353 | 5/1989 | Nicholson . |
| 4,854,600 | 8/1989 | Halling et al. . |
| 4,915,397 | 4/1990 | Nicholson . |
| 5,022,663 | 6/1991 | Fages et al. . |
| 5,158,305 | 10/1992 | Halling . |
| 5,249,814 | 10/1993 | Halling . |
| 5,433,370 | 7/1995 | Halling . |
| 5,433,456 | 7/1995 | Nicholson . |
| 5,630,593 | 5/1997 | Swensen et al. . |
| 5,669,612 | 9/1997 | Nicholson . |
| 5,716,052 | 2/1998 | Swensen et al. . |
| 5,797,604 | 8/1998 | Inagaki et al. . |
| 5,799,954 | 9/1998 | Layer . |

\* cited by examiner

*Primary Examiner*—Anthony Knight
*Assistant Examiner*—Alison K. Pickard
(74) *Attorney, Agent, or Firm*—Pepper Hamilton LLP

(57) ABSTRACT

A seal and method of using a seal are provided. The seal has a convolution region and two legs extending therefrom, and the seal may be positioned in a cavity such that an inner side of an extending leg faces a lower pressure zone; and/or an outer side of an extending leg faces a higher pressure zone.

8 Claims, 1 Drawing Sheet

RESILIENT SEAL AND METHOD OF USING A RESILIENT SEAL

FIELD OF INVENTION

The invention relates to a resilient seal.

BACKGROUND OF INVENTION

Resilient seals are known for various applications. One example of a seal intended to provide effective sealing for the increasingly large and variable displacement between cooperating members of sealing surfaces was to provide multiple convolutions between cantilever sealing members at each end of a sealing ring, such as is shown in U.S. Pat. No. 4,121,843. As conditions continued to increase a further response was needed. This came in the form of multiple-ply sealing ring construction, in which the thinner plies capable of containing the fluid under pressure, when used in layers, provided the capacity for two or more times the deflection at a given stress level. U.S. Pat. Nos. 5,249,814 and 5,716,052 describe sealing rings using this technology.

SUMMARY OF INVENTION

In an aspect, the invention relates to the positioning of a seal in a cavity such that a side of an extending leg facing away from the adjacent sealing surface of the cavity faces a lower pressure zone; and/or a side of an extending leg facing towards the adjacent sealing surface of the cavity faces a higher pressure zone.

In another aspect, the invention relates to the positioning of a seal in a cavity such that a side of an extending leg facing a sidewall of a seal faces a lower pressure zone; and/or a side of an extending leg facing away from a sidewall of a seal faces a higher pressure zone.

In yet another aspect, the invention relates to the positioning of a seal in a cavity such that an inner side of an extending leg faces a lower pressure zone; and/or an outer side of an extending leg faces a higher pressure zone.

DETAILED DESCRIPTION OF THE PREFERRED EMBODIMENTS

In one embodiment, the invention relates to a multiple-ply sealing ring, using a plurality of nested plies. The shape of the end portions of the invention allows these end portions of the sealing section to be fully operational resilient members of the seal. The plies are free to act as independent entities when contact is established with the co-operating surfaces. They are therefore, more compliant and better able to maintain contact with dips in wavy sealing surfaces compared to ends having tightly formed loops.

Figure 1:
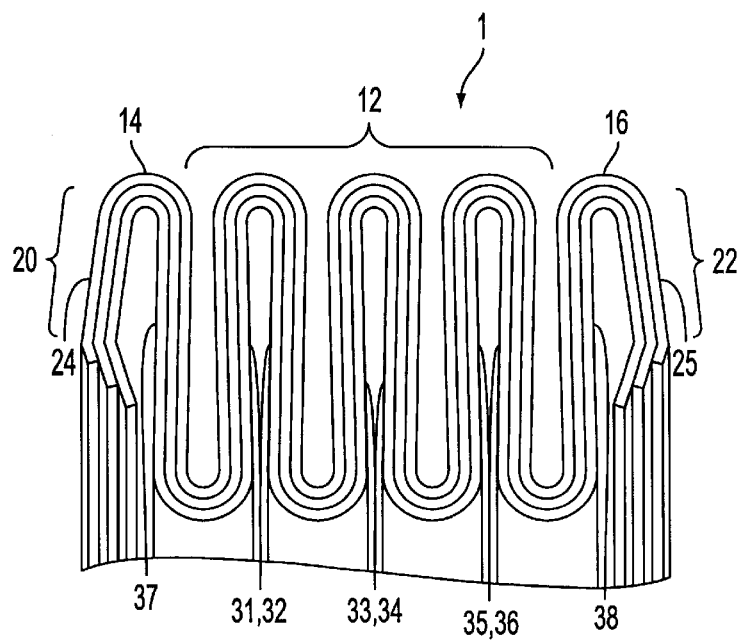
FIG. 1 is a side sectional cutaway view of a seal according to a preferred embodiment, in a free state.

Referring now to a preferred embodiment of the invention depicted in FIG. 1, a seal 1 embodies a structure, which in meridional cross-section has three serpentine plies, which are disposed more or less adjacent to each other. Each of the serpentine plies of the seal 1 form a convolution region 12 (which may be one or more convolutions), at least a pair of acute bends 14, 16, and leg regions 20, 22. The seal may be of a continuous planform outline and may be unitary. The leg regions 20, 22 provide additional deflection capability to the seal. Each of the plies in the leg regions 22, 22 act independently. The seal is therefore capable of accommodating a desirable degree of waviness or warpage in the co-operating component sealing faces.

The convolution region 12 in FIG. 1 has six intermediate wall portions 31, 32, 33, 34, 35 and 36, and two sidewall portions 37 and 38, with the intermediate wall portions and sidewall portions joined by arcuate bends as shown. Seals according to the invention may have more or less convolutions. For example the seal might have only sidewall portions similar to portions 37 and 38 joined to each other by one arcuate bend. The seal may have any number of plies, including, e.g., two plies, only one, or more than three.

Figure 2:
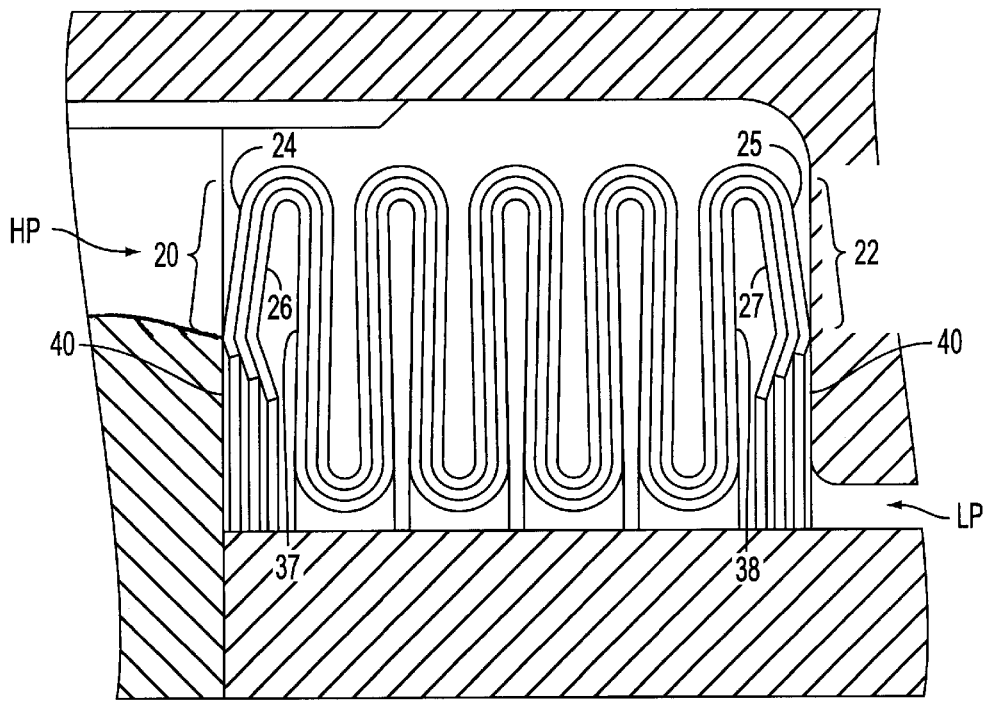
FIG. 2 is a side sectional cutaway view of a seal according to a preferred embodiment, showing the seal installed in a cavity, but not fully compressed.

FIG. 2 shows the installation orientation of an embodiment of the seal in one type of cavity. A lower pressure zone is designated by LP, and a higher pressure zone is designated by HP. It is possible to install the seal so that the "inner" surfaces 26, 27 of the legs face the lower pressure zone and the "outer" surfaces 24, 25 face the higher pressure zone. The length of the seal leg regions 20, 22 compared to the span or depth of the convolution may be adjusted to maintain positive pressure-energization of the seal, even though by comparison with some prior art seals, in this orientation the seal appears to be installed "backwards" in relation to the direction of the pressure differential. This configuration has been discovered to have a collateral advantage—pressure energization forces (those tending to drive the leg regions 20 and 22 outwards (i.e., against the sealing interface)) are reduced. The reduction of the pressure-energization forces achieved by the present invention reduces the contact stresses at the two sealing interfaces. In some cases, this reduction may permit slightly more leakage to migrate across the sealing surfaces than would be the case for a seal oriented the opposite way (e.g., a more "fully" pressure-energized seal). However, by virtue of the reduction in contact stresses, a seal according to this preferred embodiment also results in a lower rate of wear at the interfaces, which can be beneficial. Wear can be a critical factor in the life of a seal used in an application where large relative radial thermal displacements occur, e.g., when the co-operating components are made of two alloys with different coefficients of thermal expansion (such as Waspaloy or Alloy 718 and Incoloy 909). Other factors, such as differences in cooling airflows or temperature distribution may also cause large radial excursions. Well known cases involve turbine nozzle sealing, where the difficulty is often compounded by edge wear of seals against steps caused by small differences in the axial widths of segmented nozzle blocks.

The flexibility provided by the leg regions 20, 22 at their sealing ends achieved by the present invention also enables them to "bridge" the gaps caused by, for example, the different nozzle block widths in shorter distances; thereby increasing the effective seal contact line length and reducing leakage.

Accordingly, in one aspect, the invention relates to the positioning of a seal in a cavity such that (1) an "inner" side 26, 27 of an extending leg (e.g., a side facing a sidewall 37, 38 of a convolution region of a seal and/or a side facing away from the sealing surface 40 of the cavity) faces a low pressure zone; and/or (2) an "outer" side of an extending leg (e.g., a side facing away from a sidewall 37, 38 of a convolution region of a seal, and/or, a side facing towards the sealing surface 40 of the cavity) faces a higher pressure zone.

The illustrated embodiment is used in an "external pressure" application—the higher pressure zone is located radially outward of the seal. The leg regions 20, 22 have their free ends at their radially inward ends. The invention is also suitable for "internal pressure" applications where the higher pressure zone is located radially inward of the seal. In such an instance, the legs of the seal would have their free ends at their radially outward ends.

In the embodiment illustrated herein, each of the serpentine plies are depicted as having arcuate profiles in various places. The profiles of these plies may be either straight or may be any curved, or compound curved shape, e.g., a partial circle or a partial ellipse.

The invention provides an improved seal. It will be readily apparent to one of ordinary skill in the art that the term seal, as used herein, may refer to any number of shapes whose planform (the contour of an object as viewed from above) outline may, for example, be in the shape of an annulus (e.g., a circular ring), or in the shape of a curvilinear figure, or in the shape of a polygonal figure; where the vertices of any figure forming a seal may be, for example, arcuate in shape. If the invention is used in a sealing ring, the ring may be continuous or discontinuous.

The seals in the preferred embodiments above are preferably formed of metal, such as a nickel-base metal alloy, but may be alternatively formed of any suitable material without departing from the invention.

The invention relates to resilient seals, and may be used, e.g., with sealing rings with high deflection capability, including pressure-energized, convolution, multiple-ply sealing rings. In a multiple-ply sealing ring, where desired, the material type and thickness of any inter-ply plies may also be different from those of the inner and outer plies. This enables seals to employ materials with varying characteristics. For example, the inner and outer plies may have higher oxidation resistance and lower high-temperature strength, whereas the inter-ply ply or plies might have higher high-temperature strength and lower oxidation resistance. The inter-ply ply or plies might also, for example, be thicker than the inner and outer plies in order to have a much higher level of the strain energy of deflection, with which to overpower the inner and outer plies in providing high springback.

Some seals according to the invention may be, for example, particularly suitable for use in all types of gas turbine engines, in which thermal expansion of internal components and assemblies results in variable distance gaps between the sealing faces of cooperating sealing members, especially where these gaps must be sealed under all operating conditions to prevent the escape of high temperature working gases from their intended flow paths, leading to loss of efficiency and overheating of critical components.

While various embodiments have been described to illustrate the present invention, it will be understood by those skilled in the art that various modifications and changes can be made therein without departing from the scope of the invention as defined in the appended claims.

What is claimed is:

1. A method of sealing a cavity, comprising the step of:
   using a seal having a convolution region with multiple convolutions and two extending legs extending from the convolution regions, with each leg sealing against the cavity at a sealing surface of the cavity and each leg including a substantially straight elongated portion between the convolution region and the sealing location, the seal being positioned in the cavity with a first side of each extending leg of the seal facing away from the adjacent sealing surface of the cavity and each first side also facing a lower pressure zone; and with a second side of each extending leg facing towards the adjacent sealing surface of the cavity and each second side also facing a higher pressure zone.

2. The method according to claim 1, wherein the seal is a multiple-ply seal.

3. A method of sealing a cavity, comprising the step of:
   using a seal having a convolution region with multiple convolutions and two extending legs extending from the convolution regions, with each leg sealing against the cavity at a sealing surface of the cavity and each leg including a substantially straight elongated portion between the convolution region and the sealing location the seal being positioned in the cavity with a first side of each extending leg of the seal facing the convolution region of the seal and each first side also facing a lower pressure zone; and with a second side of each extending leg of the seal facing away from the convolution region of the seal and each second side facing a higher pressure zone.

4. The method according to claim 3, wherein the seal is a multiple-ply seal.

5. A method of sealing a cavity, comprising the step of:
   using a seal having a convolution region with multiple convolutions and two elongated extending legs extending from the convolution regions, with each leg sealing against the cavity at a sealing surface of the cavity and each leg having a length in the direction of extension of the leg, that is less than a length of the convolution substantially in the direction of extension of the leg, the seal being positioned in the cavity with a first side of each extending leg of the seal facing away from the adjacent sealing surface of the cavity and the first side also facing a lower pressure zone; and with a second side of each extending leg facing towards the adjacent sealing surface of the cavity and the second side also facing a higher pressure zone.

6. The method according to claim 5, wherein the seal is a multiple-ply seal.

7. A method of sealing a cavity, comprising the step of:
   using a seal having a convolution region with multiple convolutions and two elongated extending legs extending from the convolution regions, each leg sealing against the cavity at a sealing surface of the cavity and each leg having a length in the direction of extension of the leg, that is less than a length of the convolution substantially in the direction of extension of the leg, the seal being positioned in the cavity with a first side of each extending leg of the seal facing the convolution region of the seal and the first side also facing a lower pressure zone; and with a second side of each extending leg of the seal facing away from the convolution region of the seal and the second side facing a higher pressure zone.

8. The method according to claim 7, wherein the seal is a multiple-ply seal.

* * * * *